United States Patent
Paavilainen et al.

(10) Patent No.: US 6,598,142 B2
(45) Date of Patent: Jul. 22, 2003

(54) METHOD AND SYSTEM FOR DYNAMIC ALLOCATION AND MANAGEMENT OF SUBSCRIBER IDENTITY MODULE MEMORY IN A TELECOMMUNICATION SYSTEM

(75) Inventors: Petri Paavilainen, Espoo (FI); Petteri Heinonen, Espoo (FI)

(73) Assignee: Smarttrust Systems Oy, Sonera (FI)

( * ) Notice: Subject to any disclaimer, the term of this patent is extended or adjusted under 35 U.S.C. 154(b) by 60 days.

(21) Appl. No.: 09/860,285

(22) Filed: May 18, 2001

(65) Prior Publication Data
US 2001/0056523 A1 Dec. 27, 2001

Related U.S. Application Data

(63) Continuation of application No. PCT/FI99/00962, filed on Nov. 19, 1999.

(30) Foreign Application Priority Data
Nov. 20, 1998 (FI) .................................................. 982519

(51) Int. Cl.⁷ ............................. G06F 12/00; H04Q 7/04
(52) U.S. Cl. ..................... 711/173; 711/103; 711/104; 711/105; 711/115; 711/171; 711/172
(58) Field of Search ......................... 711/103–105, 115, 711/170–173

(56) References Cited

U.S. PATENT DOCUMENTS 5,911,485 A * 6/1999 Rossmann ................. 341/20
6,008,739 A * 12/1999 Hymel ...................... 340/7.55
6,150,962 A * 11/2000 Rossmann ................. 341/20
6,216,015 B1 * 4/2001 Hymel ...................... 455/412

FOREIGN PATENT DOCUMENTS

| EP | 0 562 890 A1 | 9/1993 | |
| EP | 0 801512 A2 * | 10/1997 | ............ H04Q/7/32 |
| WO | WO 94/30023 | 11/1994 | |
| WO | WO 97/23104 | 6/1997 | |
| WO | WO 97/36437 | 10/1997 | |

* cited by examiner

Primary Examiner—Than Nguyen
(74) Attorney, Agent, or Firm—Cohen, Pontani, Lieberman & Pavane

(57) ABSTRACT

The present invention provides, for use in telecommunication systems, a system and method enabling implementation of dynamic memory management in a subscriber identity module via an application or management system stored in the subscriber identity module. The memory regions in the subscriber identity module can be dynamically allocated to store or accommodate customers' and service providers' own applications, and the amount of information that the system operator need to store relating to the memory structures of and stored applications in subscriber identity modules that it owns or controls is significantly reduced.

14 Claims, 3 Drawing Sheets

METHOD AND SYSTEM FOR DYNAMIC ALLOCATION AND MANAGEMENT OF SUBSCRIBER IDENTITY MODULE MEMORY IN A TELECOMMUNICATION SYSTEM

CROSS-REFERENCE TO RELATED APPLICATION

This is a continuation of International Application No. PCT/FI99/00962, filed on Nov. 19, 1999.

BACKGROUND OF THE INVENTION

1. Field of the Invention

The present invention relates to telecommunication systems technology and, in particular, provides a method and system for dynamic allocation and management of subscriber identity module (SIM) memory regions or sections and for distribution of SIM memory regions or sections as between and among an operator, service provider and subscriber in a telecommunication system.

2. Description of Related Art

The subscriber identity module (SIM) that is connected to each mobile station in a telecommunication system is an essential component in providing the operating functionality of the mobile station. In mobile communication systems, as for example those utilizing the widely-used GSM (Global System for Mobile Communications) standards and protocols, new mobile network applications can be added or updated or implemented via the subscriber identity module. The subscriber identity module has conventionally been heretofore used as storage for subscriber-specific information related to mobile communication networks and for information needed for call setup. Functional applications that can be utilized in mobile communication and in other activities are also loaded on the subscriber identity module. Next-generation mobile stations will place increasing demands on the functionality of the subscriber identity module. At present, the subscriber identity module functions as a component in which the information stored and the memory areas therein defined are fairly static.

One problem with these current implementations and arrangements is that the applications stored or loaded on the subscriber identity module occupy a fixed, predetermined space in the SIM memory. The size of this predetermined memory space can be changed only by the system operator and, even then, only through the use of special means. These requirements are inefficient and deleterious where a shortened or abbreviated response time for desired changes is necessary. A further problem is that the subscriber identity module is entirely the property of the system operator, so that the customer and/or service provider is unable to place their own applications on the subscriber identity module. Yet another problem is that maintaining a database concerning the memory structures and applications on an operator's many subscriber identity modules requires a considerable amount of disk capacity and physical and management resources.

OBJECTS AND SUMMARY OF THE INVENTION

It is accordingly the desideratum of the present invention to eliminate or significantly minimize or alleviate the drawbacks and deficiencies, including by way of example those discussed hereinabove, that are present or inherent in prior art methods and arrangements for using and for storage of applications and information on subscriber identity modules.

It is a particular object of the invention to provide a novel method and system for providing or accommodating dynamic management of the memory of a subscriber identity module. The memory can be managed, for example, in accordance with the invention by an application that is stored on the subscriber identity module and/or by the operating system of the subscriber identity module and/or by the system operator. At the same time, the operator avoids the need to increase the size of its database concerning the memory structure and applications in multiple subscriber identity modules that it owns or manages, since information relating to the structure of and applications stored on each subscriber identity module can be obtained on demand as and when needed. The present invention provides the additional advantage that memory space in a subscriber identity module can be selectively released and sized for use by the customer and/or service provider, and the use and sizing of memory space in the SIM can be controlled dynamically.

The inventive method thus provides dynamic allocation of memory space in a subscriber identity module of a mobile station in a telecommunication system. The telecommunication system preferably includes a management system, a mobile station and a subscriber identity module connected to the mobile station. In accordance with the method of the invention, the memory space of the subscriber identity module is divided into two or more sections, and applications are stored in these sections of the subscriber identity module.

Dynamic allocation of the memory of the SIM can be carried out by the operating system of the SIM and/or by an application stored in the memory space. Memory regions or sections or areas may for example be allocated for applications used by one or more of the system operator, a service provider, and the subscriber/customer. The program may be seen and/or accessed by the user as a subscriber identity module memory management application. Thus, the user may for example be able to choose the amount of space to be allocated for ADN (Abbreviated Dialing Number) and SMS (Short Message Service) fields. The memory management program in the SIM can also independently manage the memory in accordance with predetermined or adjustable criteria by dynamically increasing or decreasing the file size as needed. Dynamic allocation of memory areas can also, in a preferred embodiment, be implemented using an external management system; in practice, this may mean an OTA (Over The Air) server that is maintained by the operator and which allows the operator to alter the memory structure of the SIM. The management system may also request that the subscriber identity module transmit or transfer information relating to the memory structure of the SIM and to the applications therein contained. In this way, information about the SIM memory structure may be obtained when needed, thereby avoiding an overload of the system operator's database relating to its subscriber identity modules.

The inventive system includes means for dynamic allocation of the memory of the subscriber identity module for the operator's and/or service provider's and/or subscriber's applications. The system may further include means for dynamic allocation of the memory of the SIM via the operating system of the SIM and/or an application contained in its memory space.

The inventive system may still further include means for the management of dynamic memory allocation using an external management system of the telecommunication system, and means for sending or transmitting or transferring information relating to the allocation of memory areas from the subscriber identity module to the external management system.

The invention also provides a subscriber identity module that includes a data processing device, a storage device connected to the data processing device and a data transfer device connected to the data processing device. The subscriber identity module is additionally provided with an interface for data transfer between a mobile station to which the subscriber identity module is connected and the subscriber identity module.

The inventive subscriber identity module further includes means for dynamic allocation of the memory of the SIM for use in or by or for storage of any combination of system operator and/or service provider and/or subscriber applications.

The subscriber identity module of the invention also includes means for dynamic allocation of the memory of the subscriber identity module via the operating system of the SIM and/or via an application stored or contained in its memory space, and means for transmitting allocation information from the subscriber identity module to the external management system of the telecommunication system.

The present invention, as compared with prior art systems and methods, thus advantageously renders unnecessary the maintenance of an external database containing accurate information about the SIM cards of the customers/subscribers of the system operator; instead, each subscriber identity module itself is operable to provide information to an external server of the telecommunication system, on demand, about its memory structure as and when needed. A particularly significant advantage provided by the invention is the dynamic management of the memory of the subscriber identity module. The card need not be removed to the operator's plant or facility for maintenance or updating or modification or treatment; instead, the SIM memory is remotely managed over the telecommunication system wireless link or the SIM operating system or via an application contained in the subscriber identity module itself.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENTS

Figure 1:
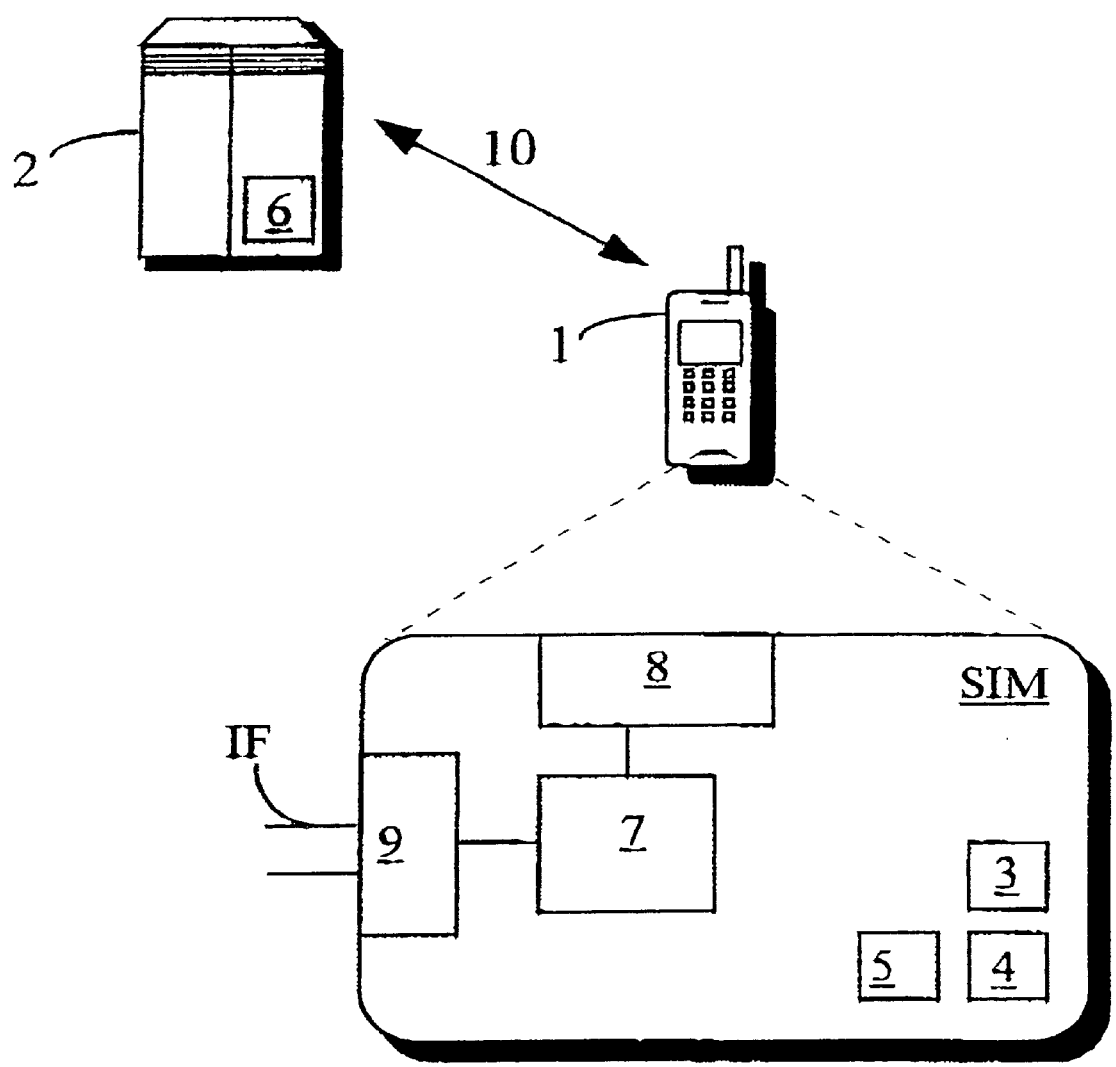
FIG. 1 is a block diagram of a preferred telecommunication system in accordance with the invention.

The mobile network telecommunication system shown in FIG. 1 includes a mobile station 1 and a management system 2 and, connected to mobile station 1, a subscriber identity module SIM. The management system 2 comprises a means 6—formed of hardware or software or a combination thereof, as will be readily apparent to persons of skill in the art with knowledge of the present invention—for managing the dynamic allocation of memory regions or sections or areas defined in the subscriber identity module SIM.

A preferred subscriber identity module SIM, as diagrammatically shown in FIG. 1, includes means 3 for dynamic allocation of the memory of the subscriber identity module SIM for use in or by or for storage of any combination of system operator and/or service provider and/or subscriber applications. Furthermore, the subscriber identity module includes means 4 for dynamic allocation of the memory of the subscriber identity module SIM via the operating system of the SIM and/or an application stored or contained in its memory space, and means 5 for transmitting allocation information from the subscriber identity module SIM to the management system 2.

The preferred subscriber identity module further includes a data processing device 7, a storage device 8 connected to the data processing device 7, and a data transfer device 9 connected to data processing device 7. The subscriber identity module SIM is additionally provided with an interface IF for data transfer between the mobile station 1 and subscriber identity module SIM.

It is contemplated and generally intended that, as if preferred, a standard protocol be used for signaling between the subscriber identity module SIM and the mobile communication network. Communication between the mobile station 1 and the management system 2, represented in FIG. 1 by the arrow 10, can be implemented using any suitable arrangement or standards or protocol such, for example, as SMS messages or USSD (Unstructured Service Data) messages.

The various means and structures of the subscriber identity module SIM, and the means 6 of the management system 2, may be implemented in any conventional manner known to those of ordinary skill in the relevant arts. Further details of such implementations, which are well known and whose implementation is in any event well within the ability of persons of ordinary skill, are therefore deemed unnecessary and are accordingly neither shown nor described herein.

Figure 2:
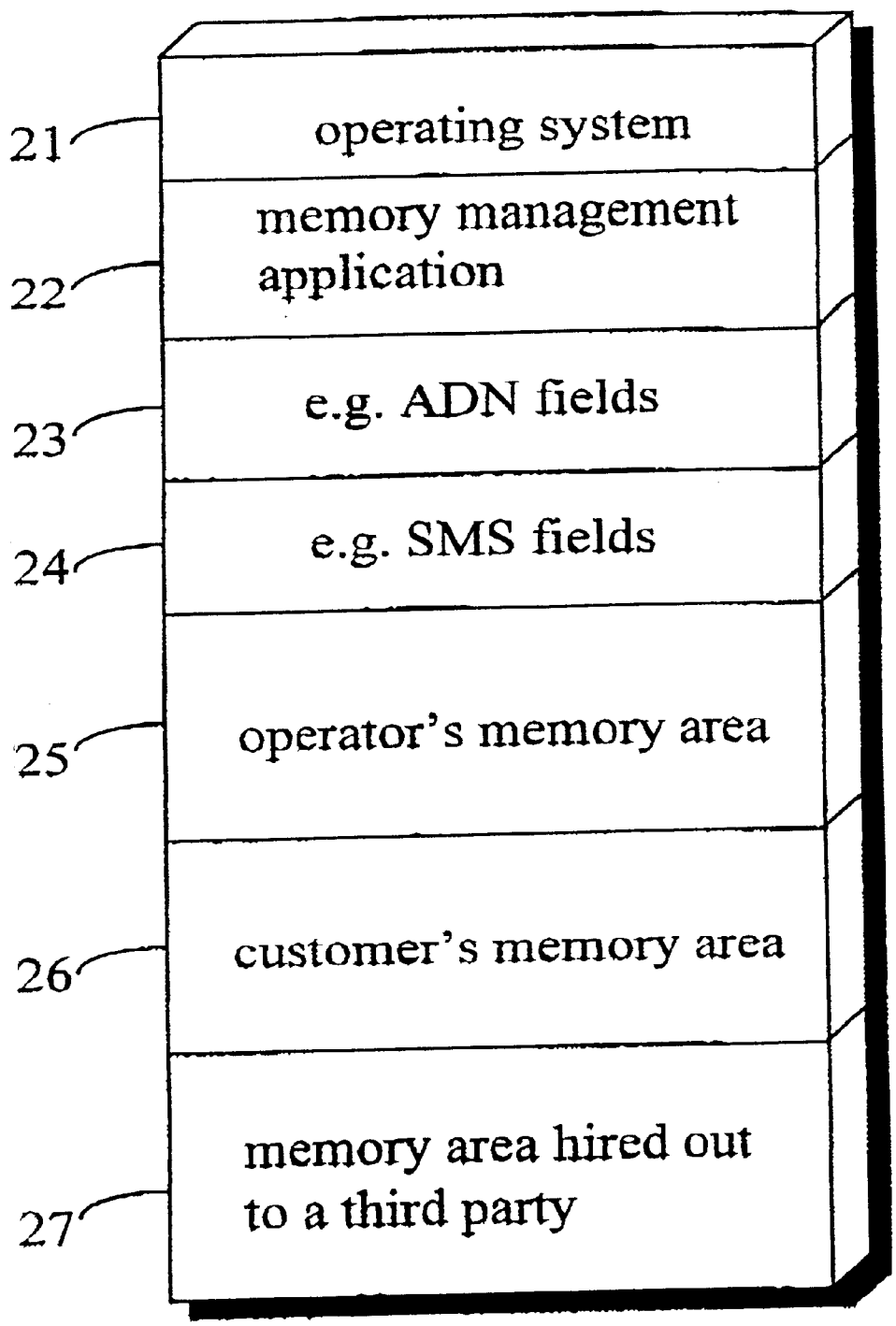
FIG. 2 is a block diagram of a preferred memory structure of a subscriber identity module in accordance with the invention.

FIG. 2 depicts a preferred form of the memory structure of the subscriber identity module SIM in accordance with the invention. As there shown by way of preferred example, the structure comprises an operating system 21 for controlling the functions of the subscriber identity module. The function of the memory management application 22, as suggested by its name, is to manage the allocation of memory areas for different applications and to transmit or transfer, upon request, information regarding the memory structure to the operator or operating system. The size of the ADN fields 23 and SMS fields 24 can be varied via the external memory management application 22 of the telecommunication system.

In accordance with the invention, several different parties may concurrently use or occupy separate respective memory areas in the subscriber identity module SIM. In the particular example herein described, these parties have been allocated an system operator's memory area 25, a customer's/subscriber's memory area 26, and a third party memory area 27.

Figure 3:
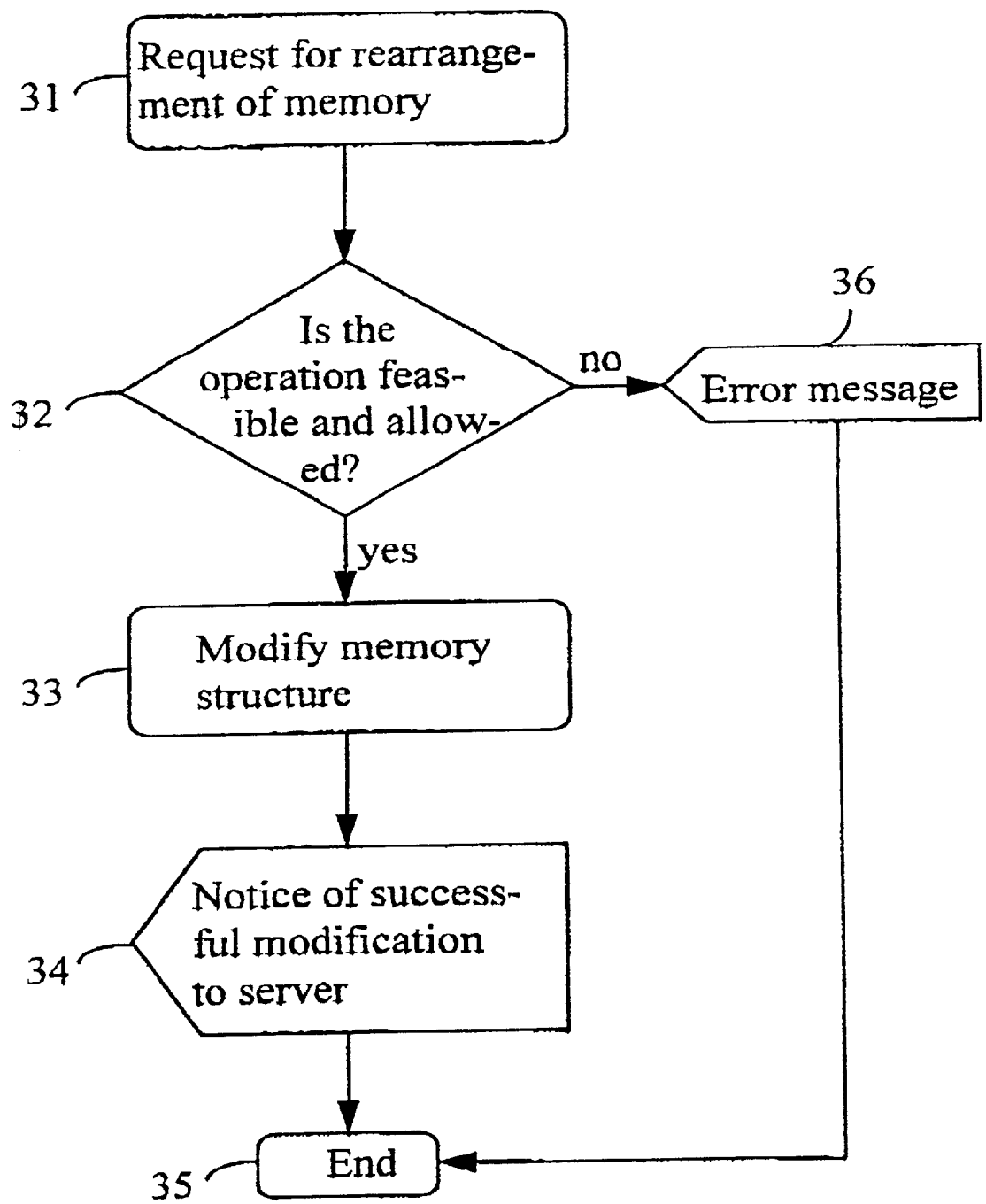
FIG. 3 is a flow chart of a preferred method of memory management in accordance with the invention.

The flow chart of FIG. 3 presents a currently-preferred embodiment of the inventive method of memory management. At block 31, a request for rearrangement or reallocation of the memory of the subscriber identity module SIM is received. This request may be originated by the user, by the system operator, or by the subscriber identity module. At block 32, a check is carried out to establish whether the required operation is feasible and permitted. In practice, this may for example mean determining whether the card has sufficient memory for the operation and whether the desired operation is among those permitted by the operator. If the operation is not permitted, then an error message is issued at block 36, and the request for rearrangement or reallocation of memory is aborted and terminates at block 35.

If, on the other hand, it is determined at block 32 that the requested operation is both feasible and permitted, then the FIG. 3 method proceeds to block 33 at which the memory structure is modified in accordance with the request received at block 31. After the desired changes have been effected, the server is notified at block 34 of the successful modification, and the memory allocation modification procedure terminates at block 35.

While there have shown and described and pointed out fundamental novel features of the invention as applied to preferred embodiments thereof, it will be understood that various omissions and substitutions and changes in the form and details of the methods described and systems and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/ or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for managing a memory space of a subscriber identity module in a telecommunication system that includes a management system and a mobile station to which the subscriber identity module is connected, comprising the steps of:

dividing the memory space of the subscriber identity module into a plurality of sections for storage of applications in said memory space sections; and dynamically allocating the memory space of the subscriber identity module by dynamically assigning individual ones of the plural memory space sections for storage, in said plural memory pace sections, of applications of at least one of an operator, a service provider and a subscriber of the telecommunication system.

2. A method in accordance with claim 1, wherein said dynamic allocation of the memory space of the subscriber identity module is carried out by at least one of an operating system of the subscriber identity module and an application stored in the memory space.

3. A method in accordance with claim 1, wherein said dynamic allocation of the memory space is managed by the management system of the telecommunication system.

4. A method in accordance with claim 1, further comprising the step of transmitting, from the subscriber identity module to the management system of the telecommunication system, information relating to allocation of the memory space of the subscriber identity module.

5. A system for managing a memory space of a subscriber identity module in a telecommunication system that includes a management system and a mobile station to which the subscriber identity module is connected, said system comprising:

the memory space of the subscriber identity module being divided into a plurality of sections for storage of applications in said memory space sections; and means for dynamically allocating the memory space of the subscriber identity module by dynamically assigning individual ones of the plural memory space sections for storage, in said plural memory space sections, of applications of at least one of an operator, a service provider and a subscriber of the telecommunication system.

6. A system in accordance with claim 5, further comprising means for dynamic allocation of the memory space of the subscriber identity module via at least one of an operating system of the subscriber identity module and an application stored in the memory space.

7. A system in accordance with claim 5, further comprising means for transmitting, from the subscriber identity module to the management system of the telecommunication system, information relating to allocation of the memory space of the subscriber identity module.

8. A system in accordance with claim 5, further comprising means for management of the dynamic allocation of the memory space of the subscriber identity module by the management system of the telecommunication system.

9. In a subscriber identity module that includes a data processing device, a storage device connected to the data processing device for defining a memory space of the subscriber identity module, a data transfer device connected to the data processing device, and an interface for transfer of information between the subscriber identity module and a telecommunication system mobile station to which the subscriber identity module is connectable, means for dynamically allocating the memory space of the subscriber identity module for storage in the memory space of applications of at least one of an operator, a service provider and a subscriber of the telecommunication system.

10. In a subscriber identity module in accordance with claim 9, means for dynamic allocation of the memory space of the subscriber identity module via at least one of an operating system of the subscriber identity module and an application stored in the memory space.

11. In a subscriber identity module in accordance with claim 9, means for transmitting, from the subscriber identity module to an external management system of the telecommunication system, information relating to allocation of the memory space of the subscriber identity module.

12. The method of claim 2, wherein said application stored in the memory space is a memory management program that independently manages the memory space in accordance with at least one of predetermined criteria and adjustable criteria, by at least one of dynamically increasing and dynamically decreasing the size of at least one file.

13. The method of claim 1, wherein said memory space is at least one of selectively released and selectively resized for use by at least one of the subscriber and service provider.

14. The method of claim 1, further comprising the step of choosing an amount of space to be allocated by the subscriber for Abbreviated Dialing Numbers and Short Message Service fields.

* * * * *